United States Patent Office 3,492,265
Patented Jan. 27, 1970

3,492,265
ADHESIVE RESIN COMPOSITIONS
Jack D. Hefley, Charlotte, N.C., and Julius J. Brezinski, St. Albans, W. Va., assignors to Union Carbide Corporation, a corporation of New York
No Drawing. Filed Mar. 22, 1966, Ser. No. 536,319
Int. Cl. C09j 3/14; C08f 37/18
U.S. Cl. 260—41
6 Claims

ABSTRACT OF THE DISCLOSURE

A vinyl resin adhesive composition of (a) a resin component of (1) from about 10% to 100% by weight of a terpolymer of a vinyl halide, a vinyl ester of a lower saturated fatty acid and an aliphatic $\alpha,\beta$-olefinically unsaturated carboxylic acid constituting 0.1% to 4.0% by weight of the terpolymer and (2) from 0% to about 90% by weight of the resin component of a compatible vinyl homopolymer or copolymer and (b) from about 0.5% to 5.0% based on the weight of the resin component of an additive selected from the group consisting of metal acetates, propionates, nitrates and oxides, wherein the metal is one selected from the group consisting of calcium, magnesium and zinc.

---

This invention relates to adhesive resin compositions. More particularly this invention relates to vinyl resin compositions containing adhesion promoters which impart improved adhesion properties thereto.

The use of resin compositions as adhesives is known. The resin is adhered to a surface such as that of plastic or metal by coating it thereon in solution form and evaporating the solvent of the solution, by heat sealing the resin to such surface or by a combination thereof as where a resin coated surface is heat sealed to another surface. For example resin coated metal foils, such as vinyl resin-metal foil laminates have found wide commercial use in applications such as packaging for food items and other articles. Typically, the article to be packaged is placed between two sheets of the foil-vinyl resin laminate, the sheets being arranged so that their resin coated areas face each other and heat and pressure are applied to the overlapping edges of the sheets until the adhesive, i.e., the respective resin laminates, bonds the sheets together.

In packaging and other applications the resin compositions employed must exhibit adequate adhesive strength whether bonded to substrates such as a resin, a metal or a combination thereof. For example, it has been found that where two vinyl resin-metal foil laminates are heat sealed together at their resin surfaces, as in the above packaging operation, the bond strength of the resulting double laminate, at each resin-foil interface and the resin-resin interface thereof is deemed satisfactory when it is greater than about 1.40 pounds per square inch of peel, i.e., the force required to separate one square inch of one substrate from another, by the procedure hereinafter described, to provide satisfactory performance.

The resin adhesives, particularly the vinyl resin adhesives heretofore employed, have been found to provide variable adhesion with the bond strengths between the respective interfaces, above, varying between approximately 0.50 and 2.00 pounds per square inch of peel, particularly at the foil-resin interface, causing delamination thereof when the bond strength is at or near the lower value, under conditions of ordinary use. It is necessary therefore to provide improved vinyl resin adhesive systems adapted to impart increased bond strength to the above foil laminates.

Accordingly, it is an object of the present invention to provide a vinyl resin composition having improved adhesion properties.

It is another object of the present invention to provide vinyl resin-metal foil laminates having an improved overall bond strength.

These and other objects are accomplished by the present invention which provides a vinyl resin adheisve composition comprising:

(a) A resin component comprising:

(1) From about 10% to 100% by weight of said resin component of a terpolymer of a vinyl halide, a vinyl ester of a lower saturated fatty acid and an aliphatic $\alpha,\beta$-olefinically unsaturated carboxylic acid, said acid constituting from about 0.1% to 4.0% by weight of the terpolymer and (2) From 0% to about 90% by weight of said resin component of a compatible vinyl homopolymer or copolymer, and (b) From about 0.5% to 5.0% based on the weight of said resin component of an additive containing metal acetates, propionates, nitrates and/or oxides wherein said metal is calcium, magnesium and/or zinc.

It is indeed unexpected that the addition of small amounts, or additives, i.e. metal salts or oxides, to vinyl resin formulations give surprising increases of up to 90 percent in the adhesive bond strength thereof to substrate materials such as metals, particularly metal foil, resins and the like.

The adhesive composition of the invention thus includes as hereinafter described, a small quantity of one or more metallic salts of oxides and a vinyl resin component. In addition, a volatile organic solvent is preferably used to reduce the viscosity of the composition for the purpose of facilitating the coating of the composition on a suitable substrate, as for example, metal foil. The coating is thereafter dried by evaporation of the solvent either at room or elevated temperatures up to 100° C. or more to form the resultant laminate.

The adhesive composition of the invention is readily bonded to one or more substrates to form laminates of improved bond strength. It can be coated on a substrate as indicated and/or bonded to a substrate by heat sealing procedures. Additionally the adhesive composition can serve to unite two or more substrates as where it is coated on one substrate and heat sealed to another. Thus where two sheets of metal foil are coated with the above adhesive composition, to form two vinyl resin-metal foil laminates and the laminates are heat sealed together at their resin surfaces, the overall bond strength of the resulting double laminate is markedly improved over similar resin-foil laminates heretofore available.

The additives are added to the vinyl resin component in amounts of about 5% or less, as indicated, based on the weight of such component. At least some of the additives react with the vinyl resin component in solution, particularly the oxides of zinc, calcium and magnesium which combine with the acid constituent thereof. The additives are preferably employed in the form of small particles.

Other metal salts have been found to be ineffective as adhesion promoters for the aforementioned vinyl resin component. Thus lead sulfate does not improve the bond strength of the above resin adhesive and exhibits toxic properties unsuitable for food packaging while zinc chloride has been found to be detrimental acting as a Friedel-Crafts catalyst causing polymer decomposition.

The vinyl resin component of the adhesive composition of the invention contains (a) an essential material which constitutes 10% to 100% and preferably, 50% to 100% of the resin component and, optionally, (b) a filler material which though non-essential, can constitute from 0% to 90% and preferably, 0% to 50% of the resin component as hereinafter described. The essential material includes a terpolymer of a vinyl halide, preferably vinyl chloride, a vinyl ester of a lower saturated fatty acid, preferably vinyl acetate and an aliphatic alpha, beta-mono-olefinically unsaturated carboxylic acid, preferably maleic acid, the amount of carboxylic acid combined in the terpolymer being between about 0.1% to about 4% by weight of the terpolymer and the carboxyl groups in the terpolymer being substantially unreacted. The optimum amount of maleic acid, when it is used as the third constituent of the terpolymer, is about 0.3% to 3% by weight of such terpolymer. The proportion of the vinyl halide constituent in the terpolymer is in the range of about 60% to 95% by weight thereof the balance being said vinyl ester and said acid constituents. Preferably, the essential material of the vinyl resin component is a terpolymer having, by weight, 85.0 to 88.0% vinyl chloride, 0.8 to 1.2% maleic acid and 10.8 to 14.2% vinyl acetate as exemplified by "VMCH" resin a trademark of Union Carbide Corporation, New York, N.Y.

The filler material contains one or more other vinyl homopolymers or copolymers which are compatible with said essential material, as evidenced by clarity of a solution of the mixed resin component. Copolymers of vinyl chloride and vinyl acetate are suitable for such compatible mixtures, e.g., proportions by weight of 80 to 95% vinyl chloride and 5 to 20% vinyl acetate.

A plasticizer can be employed with the resin component of the composition of the invention. Such plasticizers are known in the art and include esters of phthalic acid, esters of adipic acid and the like. Preferably however a plasticizer is not included in the composition of the invention. In addition, other materials such as waxes, dyes and thermal stabilizers can be used in the composition of the invention as additives, as is understood by those skilled in the art.

The solvent used to reduce the viscosity of the composition to assist its application to a suitable substrate material, such as metal foil, is not critical and can be selected from various known volatile organic solvents such as ketones including methyl ethyl ketone, and acetone, ethyl acetate, toluene, ether alcohols and the like.

The substrate material or materials employed is suitable metal foil and preferably aluminum foil. However, other metal substrates can be satisfactorily bonded to the composition of the invention including sheets or foils of steel, tin, copper, and the like or alloys thereof. Other substrate materials can also be selected including plastics and/or cellulosic materials where desired without departing from the scope of the invention.

The composition can be applied to the substrate employed in any desired pattern, i.e., it can be applied so as to coat the entire surface or surfaces thereof, or applied in a strip pattern, spot pattern and the like.

The composition of the invention is suitable for heat sealing to one or more substrate materials, as where one vinyl resin-metal foil laminate is bonded to another at their respective resin surfaces, by, for example, a pair of platens, at a platen temperature of about 65° C. to 260° C. for about ¼ second to 10 seconds, time generally varying inversely with temperature. Any suitable pressure can be employed as hereinafter indicated.

The adhesive composition is suitably adhered to one or more substrate materials, including bonding one substrate material to another, by any suitable means including the aforementioned coating and heat sealing techniques. The adhesive composition is particularly useful in packaging applications for food and other articles as where at least two laminates of, for example, vinyl resin-metal foil are heat sealed together at the marginal, or other appropriate portions of their respective resin surfaces or where one such laminate is folded so that the resin surfaces thereof are adjacent and heat sealing is applied as above. Other multi-laminar structures can be fashioned with many layers of adhesive and foil being bonded together in various combinations to meet the requirements of a desired application. Foil or other substrate materials of various shapes and sizes, with or without apertures therein can be employed in such structures.

The following examples are intended as an illustration of the invention and should not be construed in limitation thereof. All parts and percentages given are by weight unless otherwise specified.

EXAMPLES 1–9

A vinyl resin composition consisting of VMCH resin and calcium oxide was prepared for lamination with .002 inch thick aluminum foil as follows. About 100 grams of the VMCH resin was dissolved at 20% solids in a solvent composed of, by weight, 41.5% ethyl acetate, 31.5% acetone and 27.0% toluene, the solvent being at room temperature. Then about 1 gram of calcium oxide was added to the above solution and dispersed therein by stirring.

The resulting coating solution was thereafter applied to two 6 inch by ½ inch strips of the aluminum foil, each foil strip being ½ inch wide, 6 inches long and 0.002 inch thick, with a No. 26 Meyer bar. The coated strips were then air dried for one minute and then dried in an oven at about 110° C. also for one minute to yield a coating for each strip of approximately 0.3 mil thickness. The two laminate strips where heat sealed together except for one end thereof within one hour after removal from the oven. The heat sealing conditions were 1 second dwell time, 90 p.s.i.g. and 163° C.

The heat sealed specimen was allowed to stand for 24 hours at standard conditions of temperature and humidity, e.g. 23° C., 50% relative humidity and atmospheric pressure. The bond strength of the laminates were tested by spreading apart the unbonded ends thereof 180° and applying the "Instron 90° (T-type) peel test which consists of clamping the spread ends of the strip in rigid jaws, and moving the jaws apart to achieve a peel rate of 10 inches per minute. The bond strength of the laminate was thus determined to be 2.03 pounds per square inch of peel.

Other examples were conducted, using the above procedure, for the VMCH resin-aluminum foil laminate with various additive and without any additive as illustrated in Table I. The heat-sealing conditions were as indicated above.

TABLE I.—EFFECT OF VARIOUS ADDITIVES TO VMCH

| | Resin solutions | | |
|---|---|---|---|
| Example | Additive | Bond strength, p.s.i. | Percent increase |
| Control | None (VMCH alone) (1%) | 1.11 | |
| 2 | Calcium Acetate (1%) | 2.10 | 89 |
| 3 | Calcium Nitrate (1%) | 1.43 | 29 |
| 4 | Magnesium Acetate (1%) | 1.93 | 74 |
| 5 | Magnesium Nitrate (1%) | 1.48 | 33 |
| 6 | Magnesium Oxide (1%) | 2.02 | 82 |
| 7 | Zinc Acetate (1%) | 1.76 | 59 |
| 8 | Zinc Nitrate (1%) | 1.56 | 41 |
| 9 | Zinc Oxide (1%) | 1.63 | 47 |

The propionates of calcium, magnesium and zinc improve the bond strength of vinyl resin adhesives in an amount comparable to the acetates thereof.

Thus it is readily apparent that the addition of small amounts of the additives of the invention markedly increase the bond strength of vinyl resin adhesives and of the vinyl resin-metal foil laminates.

What is claimed is:
1. A vinyl resin adhesive composition comprising:
   (a) a resin component comprising:
      (1) from about 10% to 100% by weight, of said resin component of a terpolymer of a vinyl halide, a vinyl ester of a lower saturated fatty acid and an aliphatic α,β-olefinically unsaturated carboxylic acid, said acid constituting from about 0.1% to 4.0% by weight of the terpolymer and

(2) from about 0% to about 90% by weight of said resin component of a compatible vinyl homopolymer or copolymer, and (b) from about 0.5% to 5.0% based on the weight of said resin component of an additive selected from the group consisting of metal acetates, propionates, and nitrates wherein said metal is one selected from the group consisting of calcium, magnesium and zinc.

2. The composition of claim 1 wherein said additive includes a metal acetate wherein said metal is member selected from the group consisting of calcium, magnesium and zinc.

3. The composition of claim 1 wherein said additive includes a metal propionate wherein said metal is a member selected from the group consisting of calcium, magnesium and zinc.

4. The composition of claim 1 wherein said additive includes a metal nitrate wherein said metal is a member selected from the group consisting of calcium, magnesium and zinc.

5. The composition of claim 1 wherein said terpolymer contains in proportion by weight, 85.0 to 88.0% vinyl chloride, 10.8 to 14.2% vinyl acetate and 0.8 to 1.2% maleic acid.

6. A vinyl resin adhesive composition comprising:
(a) a resin component comprising:
(1) from about 50% to 100% by weight of said resin component of a terpolymer of a vinyl halide, a vinyl ester of a lower saturated fatty acid and an aliphatic $\alpha,\beta$-olefinically unsaturated carboxylic acid, said acid constituting from about 0.1% to 4% by weight of the terpolymer and (2) from 0% to 50% by weight of said resin component of a compatible vinyl homopolyer or copolymer, and (b) from about 0.5% to 5.0% based on the weight of said resin component of an additive selected from the group consisting of metal acetates, propionates, and nitrates wherein said metal is one selected from the group consisting of calcium, magnesium and zinc.

References Cited

UNITED STATES PATENTS 2,724,707 11/1955 Brown.
2,983,641 5/1961 McConaughy _____ 260—41
3,272,772 9/1966 Russell _____ 106—306

MORRIS LIEBMAN, Primary Examiner

H. H. FLETCHER, Assistant Examiner

U.S. Cl. X.R.
260—80.8, 884, 885